(12) United States Patent
Nielsen

(10) Patent No.: US 9,992,419 B2
(45) Date of Patent: Jun. 5, 2018

(54) DISPLAY CONTROL APPARATUS FOR DISPLAYING A VIRTUAL OBJECT

(71) Applicant: SONY CORPORATION, Tokyo (JP)

(72) Inventor: Frank Nielsen, Tokyo (JP)

(73) Assignee: SONY CORPORATION, Tokyo (JP)

(*) Notice: Subject to any disclaimer, the term of this patent is extended or adjusted under 35 U.S.C. 154(b) by 109 days.

(21) Appl. No.: 14/778,047

(22) PCT Filed: Jan. 24, 2014

(86) PCT No.: PCT/JP2014/051514
§ 371 (c)(1),
(2) Date: Sep. 17, 2015

(87) PCT Pub. No.: WO2014/156257
PCT Pub. Date: Oct. 2, 2014

(65) Prior Publication Data
US 2016/0295117 A1    Oct. 6, 2016

(30) Foreign Application Priority Data
Mar. 29, 2013 (JP) ................. 2013-074221

(51) Int. Cl.
*H04N 5/265* (2006.01)
*H04N 5/232* (2006.01)
*H04N 5/262* (2006.01)

(52) U.S. Cl.
CPC ..... *H04N 5/23293* (2013.01); *H04N 5/23296* (2013.01); *H04N 5/265* (2013.01); *H04N 5/2628* (2013.01)

(58) Field of Classification Search
None
See application file for complete search history.

(56) References Cited

U.S. PATENT DOCUMENTS

| 9,213,403 B1* | 12/2015 | Raffle ............... G06F 3/011 |
| 2011/0304708 A1* | 12/2011 | Ignatov ............ H04N 13/0022 348/51 |
| 2012/0249741 A1* | 10/2012 | MacIocci .......... G06F 3/011 348/46 |
| 2012/0256906 A1* | 10/2012 | Ross ................ G06T 15/205 345/419 |

(Continued)

FOREIGN PATENT DOCUMENTS

| JP | 03-078373 A | 4/1991 |
| JP | 2001-281523 A | 10/2001 |

(Continued)

*Primary Examiner* — Kee M Tung
*Assistant Examiner* — Yanna Wu
(74) *Attorney, Agent, or Firm* — Chip Law Group

(57) ABSTRACT

A display control apparatus includes: an image acquisition section that acquires a captured image obtained by imaging an imaging range; and a display control section that controls a display section in such a way that a virtual object corresponding to an imaging subject reflecting on the captured image is displayed. The display control section displays the virtual object in such a way that a ratio of an amount of movement of the virtual object in a virtual image to an amount of movement of the imaging range in real space changes according to an imaging magnification of the captured image.

15 Claims, 15 Drawing Sheets

(56) References Cited

U.S. PATENT DOCUMENTS

| | | | |
|---|---|---|---|
| 2014/0078175 A1* | 3/2014 | Forutanpour | G02B 27/017 345/633 |
| 2014/0198242 A1* | 7/2014 | Weng | H04N 5/23293 348/333.09 |
| 2015/0062536 A1* | 3/2015 | Auger | G06T 3/40 351/239 |
| 2015/0085309 A1* | 3/2015 | Ogino | G06F 3/04883 358/1.13 |

FOREIGN PATENT DOCUMENTS

| | | |
|---|---|---|
| JP | 2002-051253 A | 2/2002 |
| JP | 2003-264740 A | 9/2003 |
| JP | 2004-128701 A | 4/2004 |
| JP | 2008-301230 A | 12/2008 |
| JP | 2009-060339 A | 3/2009 |
| JP | 2012-024772 A | 2/2012 |
| JP | 2012-165447 A | 8/2012 |
| JP | 2013-161390 A | 8/2013 |

\* cited by examiner

FIG.7
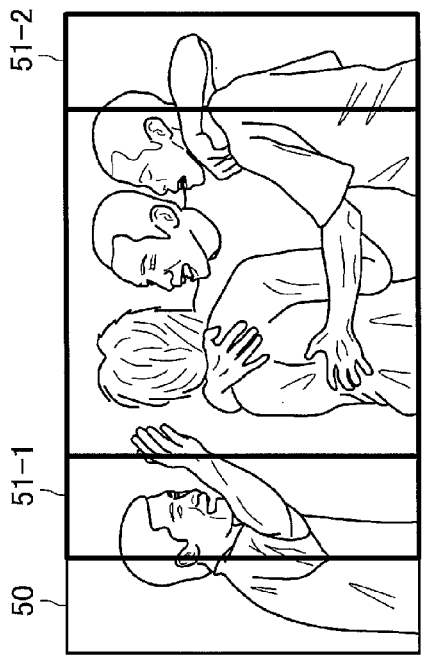
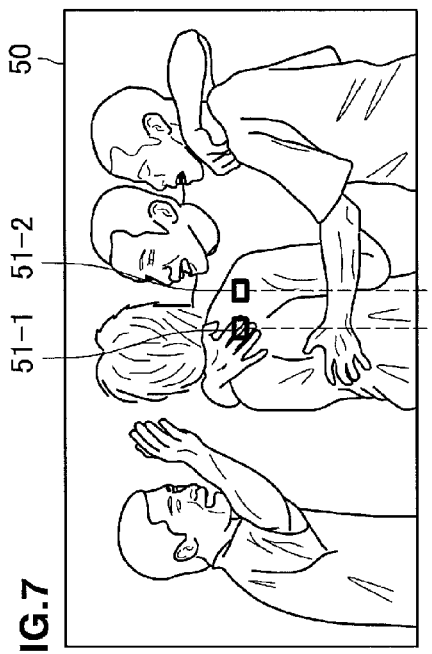
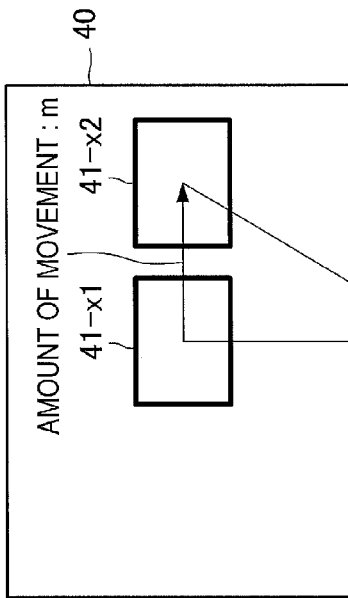
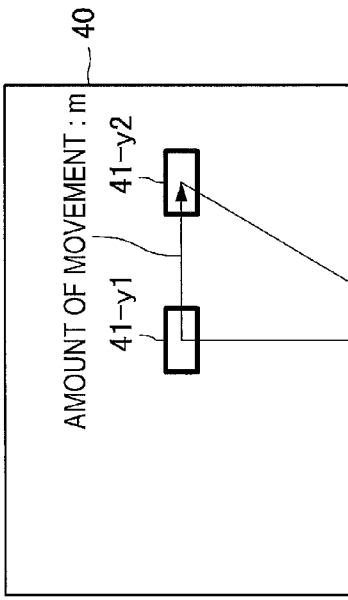

DISPLAY CONTROL APPARATUS FOR DISPLAYING A VIRTUAL OBJECT

TECHNICAL FIELD

The present invention relates to a display control apparatus, a display control method, and a recording medium.

BACKGROUND ART

Recently, cameras that store a captured image in a recording medium as an image signal have become popular. When detecting a zoom operation, a camera can sequentially display distant views using a telescopic function. However, it is difficult to keep displaying distant views infinitely because the zoom operation cannot be performed infinitely. Accordingly, a technique that enables virtual display of distant views according to the zoom operation has been disclosed (see, for example, Patent Literature 1). This technique makes it possible to virtually display distant views endlessly by performing the zoom operation infinitely.

CITATION LIST

Patent Literature

Patent Literature 1: Japanese Patent Application No. 2012-024772

SUMMARY OF INVENTION

Technical Problem

However, since a virtual object to be displayed is moved based on the positional information and directional information of the camera according to the technique, the ratio of movement of the virtual object to the amount of movement of an imaging range in real space is constant regardless of the imaging magnification. If the ratio of the amount of movement of the virtual object to the amount of movement of the imaging range in the real space is constant regardless of the imaging magnification, however, the usability for the user may not be improved. It is therefore desirable to achieve a technique of improving the usability for the user in a case of displaying a virtual object corresponding to an imaging area.

Solution to Problem

According to the present disclosure, there is provided a display control apparatus including: an image acquisition section that acquires a captured image obtained by imaging an imaging range; and a display control section that controls a display section in such a way that a virtual object corresponding to an imaging subject reflecting on the captured image is displayed. The display control section displays the virtual object in such a way that a ratio of an amount of movement of the virtual object in a virtual image to an amount of movement of the imaging range in real space changes according to an imaging magnification of the captured image.

According to the present disclosure, there is provided a display control method including: acquiring a captured image obtained by imaging an imaging range; controlling a display section in such a way that a virtual object corresponding to an imaging subject reflecting on the captured image is displayed; and displaying the virtual object in such a way that a ratio of an amount of movement of the virtual object in the virtual image to an amount of movement of the imaging range in real space changes according to an imaging magnification of the captured image.

According to the present disclosure, there is provided a computer-readable recording medium recording a program for allowing a computer to function as a display control apparatus including: an image acquisition section that acquires a captured image obtained by imaging an imaging range; and a display control section that controls a display section in such a way that a virtual object corresponding to an imaging subject reflecting on the captured image is displayed. The display control section displays the virtual object in such a way that a ratio of an amount of movement of the virtual object in a virtual image to an amount of movement of the imaging range in real space changes according to an imaging magnification of the captured image.

Advantageous Effects of Invention

As described above, the present disclosure makes it possible to improve the usability for the user in the case of displaying a virtual object corresponding to an imaging area.

BRIEF DESCRIPTION OF DRAWINGS

FIG. 7 is a diagram for describing an example of the relationship between the amount of movement of an imaging range in real space and the amount of movement of a virtual object in a virtual image.

DESCRIPTION OF EMBODIMENTS

Hereinafter, (a) preferred embodiment(s) of the present disclosure will be described in detail with reference to the appended drawings. Note that, in this specification and the drawings, elements that have substantially the same function and structure are denoted with the same reference signs, and repeated explanation is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Further, the "Description of Embodiments" will be described in the order shown below.

1. Embodiment
   1-1. Configuration example of the information processing system
   1-2. Functional configuration example of the display control apparatus
   1-3. Functional configuration example of the information processing apparatus
   1-4. Outline of the information processing system
   1-5. Detailed function of the information processing system
   1-6. Hardware configuration examples 2. Closing

1. Embodiments

First, embodiments of the present disclosure will be described.

[1-1. Configuration Example of the Information Processing System]

Figure 1:
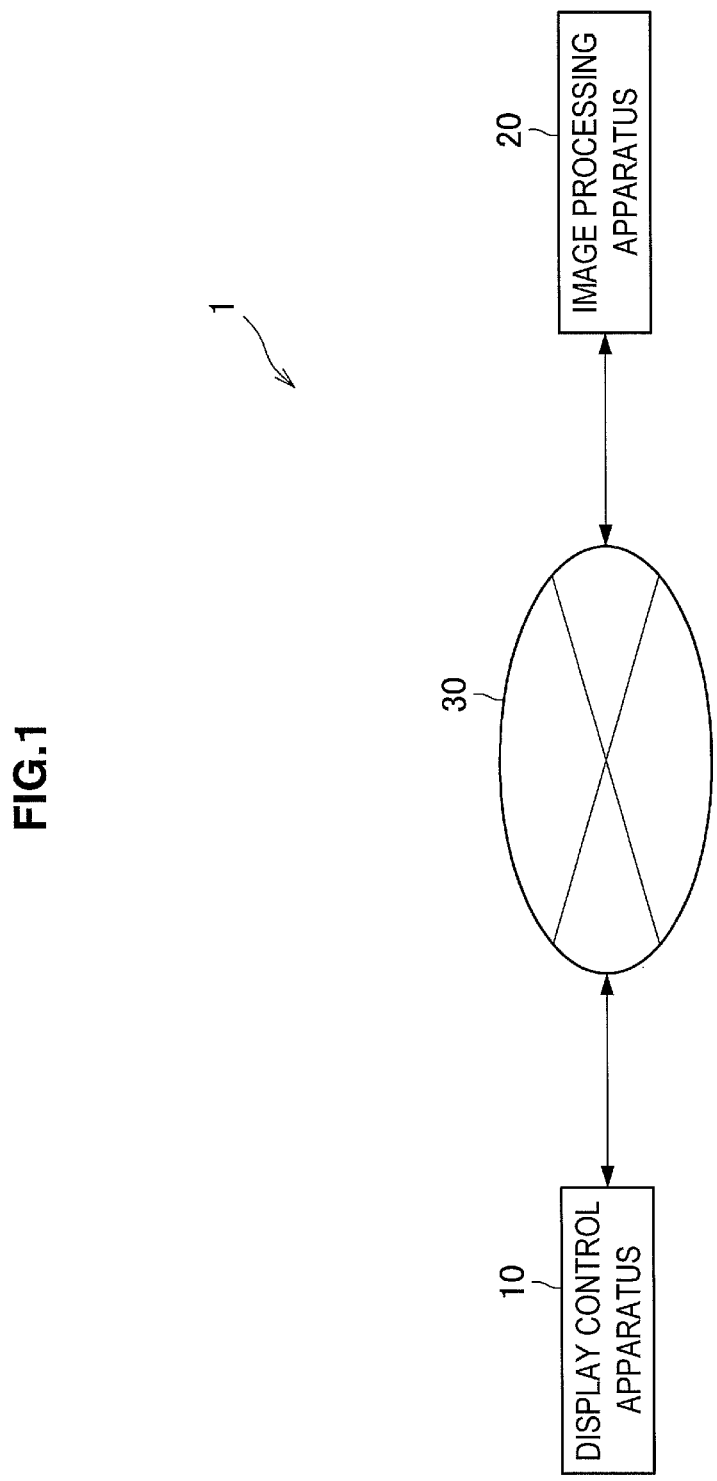
FIG. 1 is a diagram illustrating a configuration example of an information processing system according to an embodiment of the present disclosure.

First, a configuration example of an information processing system 1 according to an embodiment of the present disclosure will be described. FIG. 1 is a diagram illustrating a configuration example of the information processing system 1 according to an embodiment of the present disclosure. As shown in FIG. 1, the information processing system 1 includes a display control apparatus 10 and an information processing apparatus 20. The display control apparatus 10 and the information processing apparatus 20 can communicate with each other over a network 30.

The display control apparatus 10 has a function of performing display control. Although the following description is given of a case where the display control apparatus 10 is applied to a digital camera as an example, the display control apparatus 10 may be applied to apparatuses other than a digital camera. For example, the display control apparatus 10 may be applied to a video camera, a smart phone equipped with a camera function, a personal digital assistant (PDA), a personal computer (PC), a cellular phone, a portable music player, a portable video processing apparatus, a portable game apparatus, a telescope, a binocular, and the like.

The information processing apparatus 20 can perform processing according to a request from the display control apparatus 10, and return a processing result to the display control apparatus 10. Although the following description is given of a case where the information processing system 1 includes the information processing apparatus 20, the display control apparatus 10 may have some or all of the functions of the information processing apparatus 20 in place of the information processing apparatus 20. When the display control apparatus 10 has functional configurations described below (recognition section 211 and extraction section 212), for example, the information processing system 1 may not include the information processing device 20.

The network 30 is a wired or wireless transmission path for information which is transmitted from apparatuses connected to the network 30. For example, the network 30 may include a public line network such as the Internet, a telephone line network, or a satellite communication network, or various types of LANs (Local Area Networks) including the Ethernet (registered trademark), or WAN (Wide Area Network). The network may include a leased line network such as IP-VPN (Internet Protocol-Virtual Private Network).

[1-2. Functional Configuration Example of the Display Control Apparatus]

Figure 2:
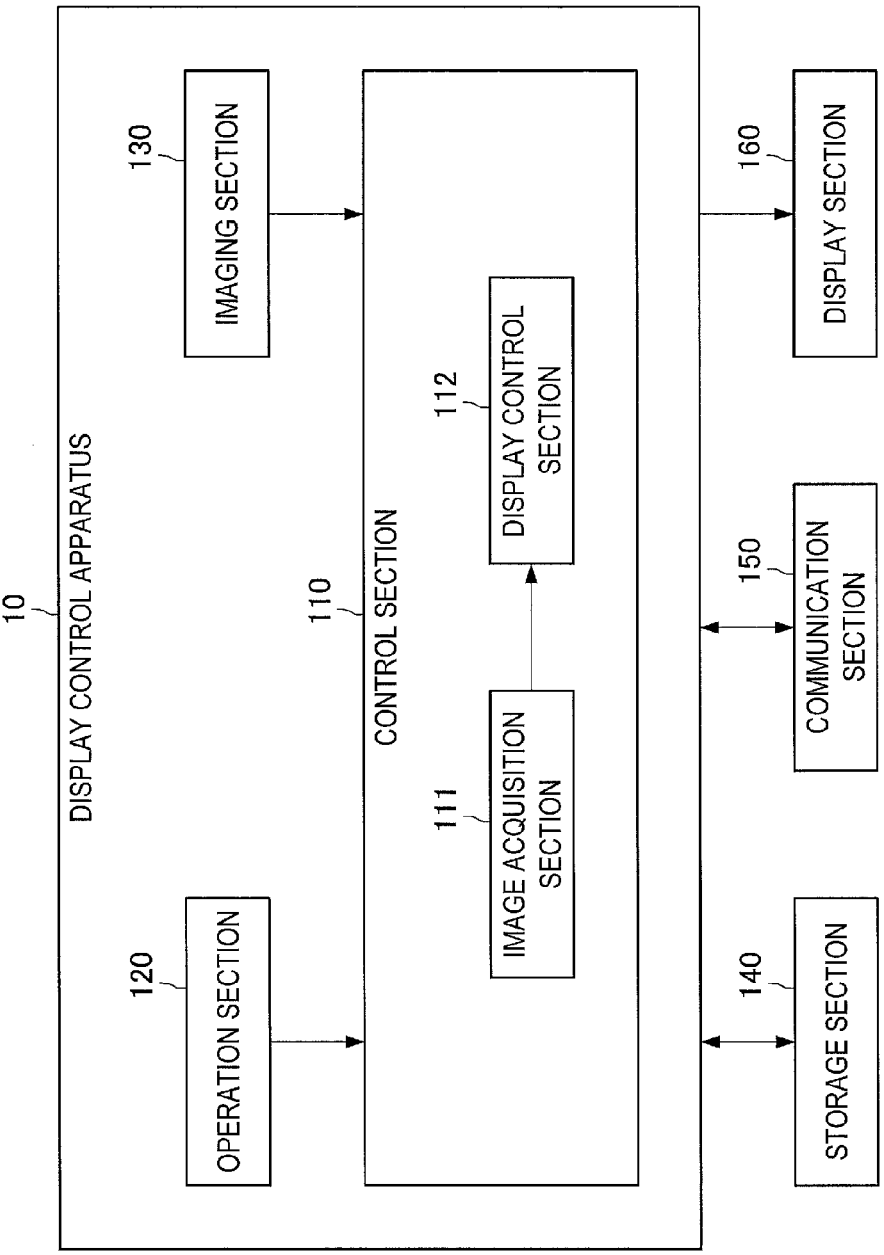
FIG. 2 is a diagram illustrating a functional configuration example of a display control apparatus according to an embodiment of the present disclosure.

Next, a functional configuration example of the display control apparatus 10 according to an embodiment of the present disclosure will be described. FIG. 2 is a diagram illustrating a functional configuration example of the display control apparatus 10 according to the embodiment of the present disclosure. As shown in FIG. 2, the display control apparatus 10 includes a control section 110, an operation section 120, an imaging section 130, a storage section 140, a communication section 150, and a display section 160.

The control section 110 corresponds to, for example, a processor such as a CPU (Central Processing Unit). The control section 110 exhibits various functions of the control section 110 by executing a program which is stored in the storage section 140 or another storage medium. The control section 110 includes an image acquisition section 111 and a display control section 112. The function of each of the image acquisition section 111 and the display control section 112 will be described later.

The operation section 120 detects a user's operation, and outputs the operation to the control section 110. Since the operation section 120 is assumed to be constituted by buttons in the present specification, the user's operation corresponds to an operation of pressing a button. However, the operation section 120 may be constituted by hardware (for example, a touch panel) other than buttons. Although the operation section 120 is integrated with the display control apparatus 10 in the example shown in FIG. 2, the operation section 120 may be configured separately from the display control apparatus 10.

The imaging section 130 acquires a captured image by imaging an imaging range, and outputs the captured image to the control section 110. The imaging section 130 performs imaging at an imaging magnification which is set according to an operation input to the operation section 120. Adjustment of the imaging magnification may be achieved by a zoom function, which is not particularly limited and may be an optical zoom function or an electronic zoom function. Although the imaging section 130 is integrated with the display control apparatus 10 in the example shown in FIG. 2, the imaging section 130 may be configured separately from the display control apparatus 10.

The storage section 140 uses a storage medium, such as a semiconductor memory or a hard disk, to store a program for operating the control section 110. In addition, for example, the storage section 140 may store various data which is used by the program (for example, various setting information, contents, etc.). Although the storage section 140 is integrated with the display control apparatus 10 in the example shown in FIG. 2, the storage section 140 may be configured separately from the display control apparatus 10.

The communication section 150 is capable of communicating with the information processing apparatus 20. The form of communication by the communication section 150 is not particularly limited. The communication by the communication section 150 may be wireless communication, of wired communication. Although the communication section 150 is integrated with the display control apparatus 10 in the example shown in FIG. 2, the communication section 150 may be configured separately from the display control apparatus 10. When the communication between the display control apparatus 10 and the information processing apparatus 20 is not required, the communication section 150 may not be provided.

The display section 160 displays various kinds of information under control of the display control section 112. The display section 160 is constituted by, for example, a liquid crystal display (LCD), an organic electroluminescence (EL) display device or the like. Although the display section 160 is integrated with the display control apparatus 10 in the example shown in FIG. 2, the display section 160 may be configured separately from the display control apparatus 10.

Heretofore, the functional configuration example of the display control apparatus 10 according to the embodiment of the present disclosure has been described.

[1-3. Functional Configuration Example of the Information Processing Apparatus]

Figure 3:
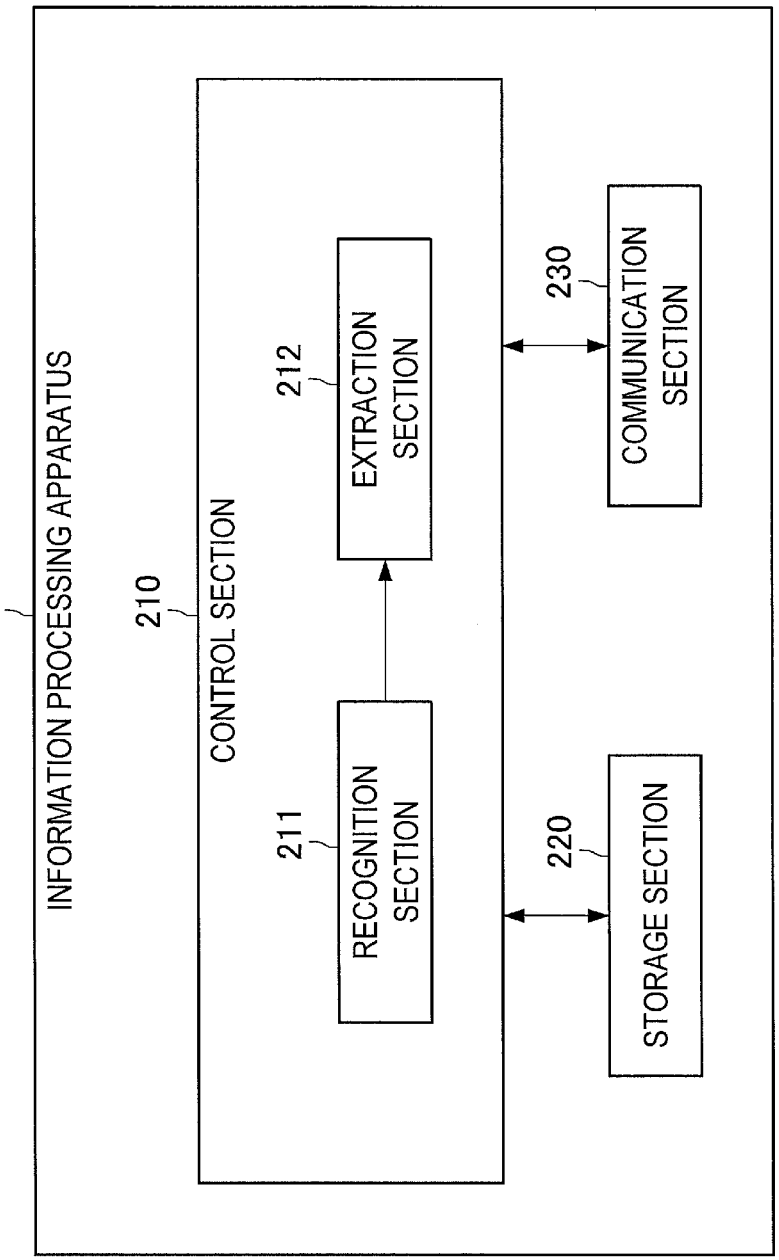
FIG. 3 is a diagram illustrating a functional configuration example of an information processing apparatus according to an embodiment of the present disclosure.

Next, a functional configuration example of the information processing apparatus 20 according to an embodiment of the present disclosure will be described. FIG. 3 is a diagram illustrating a functional configuration example of the information processing apparatus 20 according to the embodiment of the present disclosure. As shown in FIG. 3, the information processing apparatus 20 includes a control section 210, a storage section 220, and a communication section 230.

The control section 210 corresponds to, for example, a processor such as a CPU (Central Processing Unit). The control section 210 exhibits various functions of the control section 210 by executing a program which is stored in the storage section 220 or another storage medium. The control section 210 includes a recognition section 211 and an extraction section 212. The function of each of the recognition section 211 and the extraction section 212 will be described later.

The storage section 220 uses a storage medium, such as a semiconductor memory or a hard disk, to store a program for operating the control section 210. In addition, for example, the storage section 220 may store various data which is used by the program (for example, various setting information, contents, etc.). Although the storage section 220 is integrated with the information processing apparatus 20 in the example shown in FIG. 3, the storage section 220 may be configured separately from the information processing device 20.

The communication section 230 is capable of communicating with the display control apparatus 10. The form of communication by the communication section 230 is not particularly limited. The communication by the communication section 230 may be wireless communication or wired communication. Although the communication section 230 is integrated with the information processing device 20 in the example shown in FIG. 3, the communication section 230 may be configured separately from the information processing device 20.

Heretofore, the functional configuration example of the information processing apparatus 20 according to the embodiment of the present disclosure has been described.

[1-4. Outline of the Information Processing System]

Figure 4:
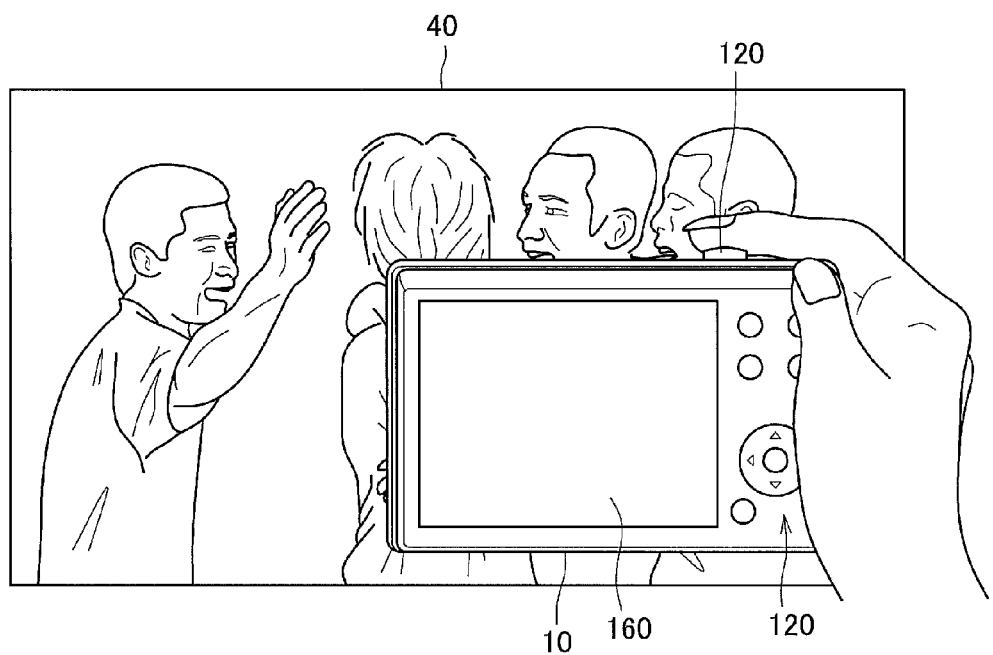
FIG. 4 is a diagram for describing the outline of the information processing system according to the embodiment of the present disclosure.

Next, the outline of the information processing system 1 according to the embodiment of the present disclosure will be described. FIG. 4 is a diagram for describing the outline of the information processing system 1 according to the embodiment of the present disclosure. As shown in FIG. 4, when the imaging section 130 captures the imaging range, the image acquisition section 111 acquires the captured image. In the example shown in FIG. 4, due to the presence of an imaging subject 40 within the imaging range, the imaging subject 40 reflects in the captured image. Although the following description is given of a case where the imaging subject 40 is a picture as an example, the imaging subject 40 may be an object other than a picture.

Figure 5:
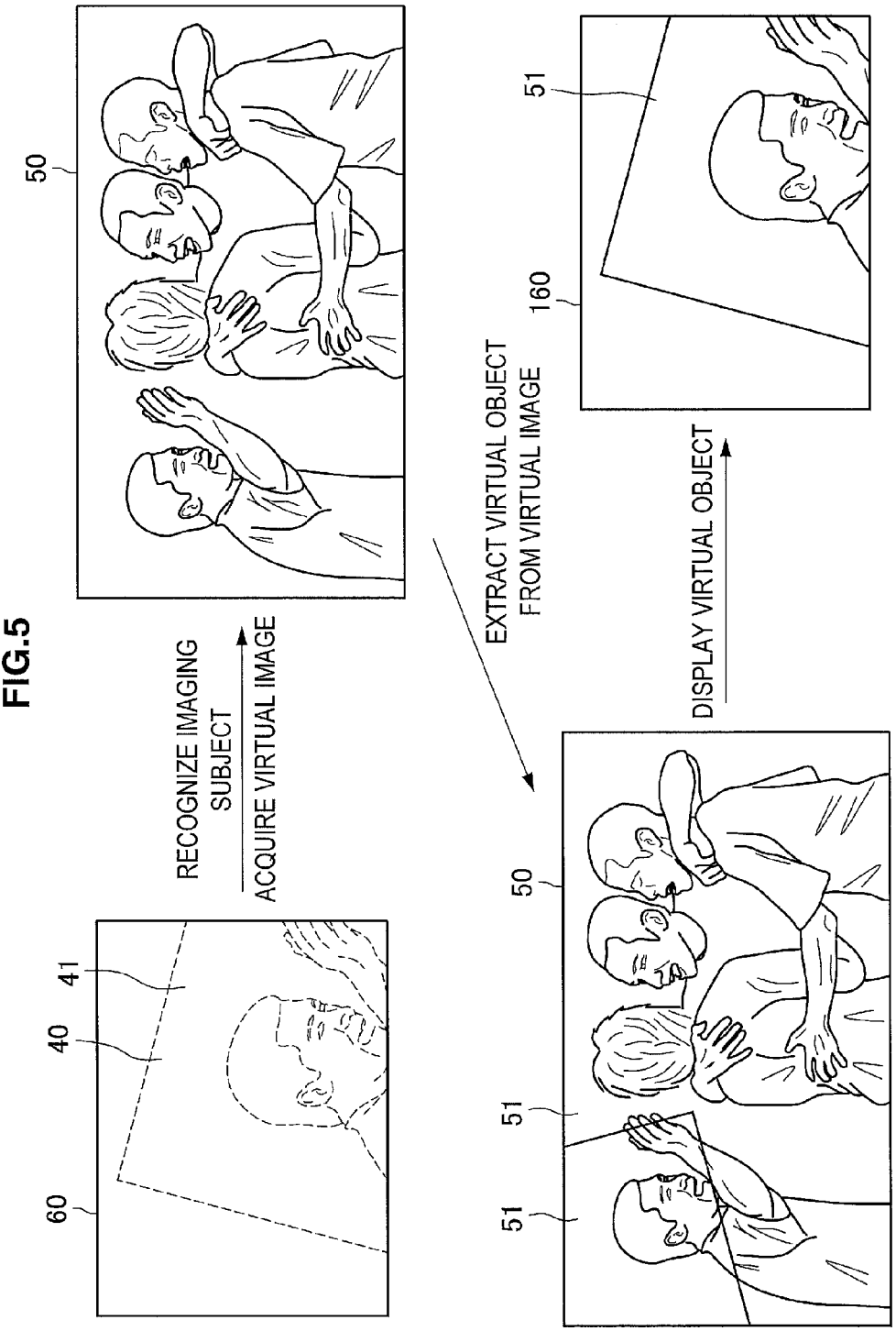
FIG. 5 is a diagram for describing an operation example of the information processing system according to the embodiment of the present disclosure.

FIG. 5 is a diagram for describing an operation example of the information processing system 1 according to the embodiment of the present disclosure. As shown in FIG. 5, when the image acquisition section 111 acquires a captured image 60, the recognition section 211 recognizes an imaging subject 40 from the captured image 60. For example, the recognition section 221 recognizes the imaging subject 40 and the position and posture of the imaging subject 40 in the real space from the captured image 60. For example, the recognition section 221 can recognize the imaged object 40 by collating the amounts of features of real objects that have been pre-registered with the amount of features that is determined from the captured image 60.

More specifically, the recognition section 221 determines the amount of features of the imaging subject 40 reflecting on the captured image 60 according to the feature amount determination method, such as SIFT or Random Ferns, and collates the determined amount of features with amounts of features of real objects pre-registered. Then, the recognition section 221 recognizes real object identification information associated with the amount of features which matches best with the amount of features of the imaging subject 40 reflecting on the captured image 60, and the position and posture of the imaging subject 40 in the real space.

Although the recognition section 221 uses a feature amount dictionary where the amount of features of a real object is associated with the real object identification information, the feature amount dictionary may be stored in the storage section 140, or may be received by the communication section 150 from a server. The amount of features of the real object may be a set of the amounts of features which are determined from a learning image of the real image according to, for example, SIFT or Random Ferns.

Note that the recognition of the imaging subject 40 is not limited to such an example. For example, the recognition section 221 may recognize the imaging subject 40 indirectly by recognizing a known shape or symbol that is associated with the imaging subject 40, or a marker, such as an artificial marker (e.g., a two-dimensional bar code such as a Cyber-Code (registered trademark) or an QR code (registered trademark)) or a natural marker. Further, the recognition section 221 may recognize the imaged object 40, and may recognize the position and posture of the imaging subject 40 from the size and shape of the imaging subject 40 in the captured image 60.

Although the above description has been given of an example where the recognition section 211 recognizes the position and posture of the imaging subject 40 included in the captured image 60 through image processing, the method of recognizing the position and posture of the imaging subject 40 it is not limited to the image-processing based recognition method. For example, the recognition section 221 may detect the posture of the imaging subject 40 and the current position of the imaging subject 40, and may estimate the position and posture of the imaging subject 40 in the captured image 60 based on the detection result.

When the imaging subject 40 is recognized, a virtual image 50 corresponding to the imaging subject 40 is acquired by the recognition section 211. For example, when information in which real object identification information is associated with a virtual image is stored in advance in the storage section 220, the recognition section 211 acquires a virtual image 50 associated with the real object identification information of the imaging subject 40 from the storage section 220.

When the virtual image 50 is acquired, the extraction section 212 extracts a virtual object 51 from the virtual image 50. For example, the extraction section 212 extracts the virtual object 51 corresponding to the imaging location 41 in the imaging subject 40 from the virtual image 50. More specifically, as shown in FIG. 5, the extraction section 212 determines the position of the virtual object 51 that corresponds to the imaging location 41 in the imaging subject 40 according to the position and posture of the imaging subject 40, and extracts the virtual object 51 present at the determined position from the virtual image 50.

When the virtual object 51 is extracted, the display control section 112 controls the display section 160 so that the virtual object 51 is displayed by the display section 160. For example, the display control section 112 may display the virtual object 51 in place of the captured image 60, or may display a composite image having the virtual object 51 superimposed on the pickup image 60. In the case of displaying a composite image, as shown in FIG. 5, the display control section 112 may display, on the display section 160, a composite image in which the virtual object 51 is superimposed on the captured image 60 by adjusting the position and posture of the virtual object 51 in such a way as to match the position and posture of the imaging subject 40.

The display control section 112 may display the virtual object 51 extracted by the extracting section 212 as it is, or may process the virtual object 51 before displaying the virtual object 51. For example, the display control section 112 may carry out control to perform a filtering process according to the captured image 60 on the virtual object 51, so that the filtered virtual object is displayed. The filtering process may be a process of approximating the pixel values of the virtual object to the pixel values of the captured image. A technique such as lighting or color transfer may be used as the filtering process.

When the imaging magnification is changed according to the operation by the user with the virtual object 51 displayed in the above manner, the extraction section 212 extracts the virtual object 51 which is changed according to the changed imaging magnification from the virtual image 50, and the display control section 112 controls the display of the extracted virtual object 51. For example, the extraction section 212 has only to extract a virtual object 51 with a narrower area from the virtual image 50 as the imaging magnification becomes higher.

Figure 6:
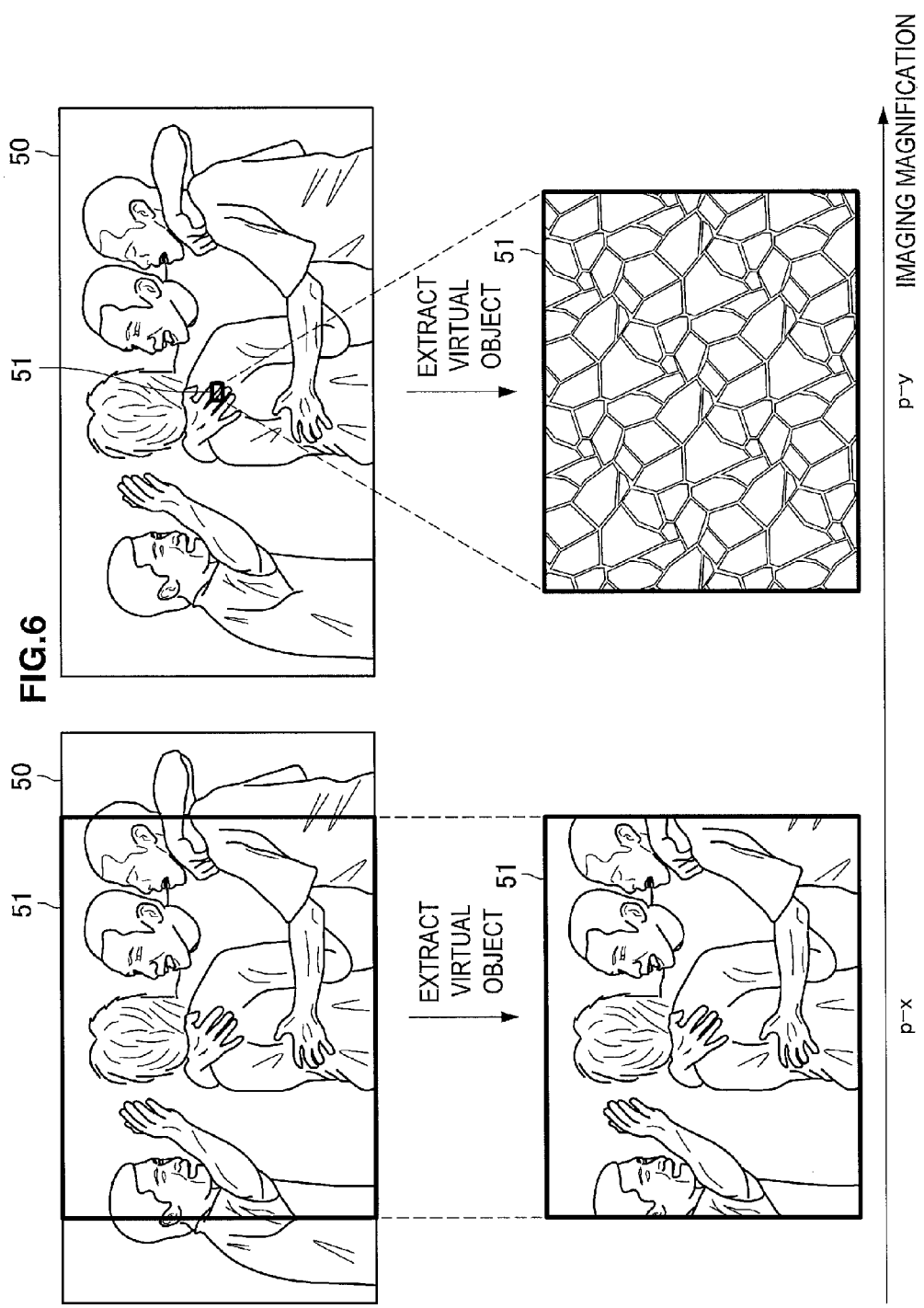
FIG. 6 is a diagram for describing extraction of a virtual object corresponding to an imaging magnification.

FIG. 6 is a diagram for describing extraction of a virtual object 51 corresponding to the imaging magnification. In the example shown in FIG. 6, an imaging magnification p-y is higher than an imaging magnification p-x. In such a case, a virtual object 51 should be extracted in such a way that the virtual object 51 to be extracted according to the imaging magnification p-y has a smaller area than the virtual object 51 to be extracted according to the imaging magnification p-x.

Generally, it is considered that the sharpness of the captured image 60 becomes lower as the imaging magnification becomes higher. On the other hand, extracting and displaying a virtual object 51 corresponding to the imaging magnification in the above manner makes it possible to display the virtual object 51 corresponding to the imaging magnification without reducing the sharpness even if the imaging magnification is increased. In case of the imaging magnification p-y, as shown in FIG. 6, a narrow area in the virtual image 50 is extracted and displayed as a virtual object 51, the sharpness of the virtual object 51 need not be reduced.

When the imaging range is moved by the user, it is necessary to move the virtual object 51 in the virtual image 50 according to the movement of the imaging range. In this case, as described above, if the ratio of the amount of movement of the virtual object 51 in the virtual image 50 to the amount of movement of the imaging range in the real space is constant regardless of the imaging magnification, the usability of the user may not be improved.

Specific examples will be described below. FIG. 7 is a diagram for describing an example of the relationship between the movement amount of the imaging range in the real space and the amount of movement of the virtual object 51 in the virtual image 50. As shown in FIG. 7, it is assumed that the imaging magnification p-y is higher than the imaging magnification p-x. In such cases, imaging locations 41-y1, 41-y2 at the imaging magnification p-y have smaller areas than the imaging locations 41-x1, 41-x2 at the imaging magnification p-x.

When the user moves the imaging range by the amount of movement, m, (or when the imaging direction is rotated by or an angle a), therefore, the amount of relative movement of the imaging range based on the size of the imaging location becomes large when imaging at the imaging magnification p-y, as compared with the case of imaging at the imaging magnification p-x. When the amount of relative movement of the imaging range becomes large, it may become difficult to fit the location to be imaged by the user within the imaging range.

Accordingly, a technique is proposed in this specification that can improve the usability of the user in the case of displaying a virtual object 51 corresponding to the imaging location. Specifically, the display control section 112 has only to display the virtual object 51 in such a way that the ratio of the amount of movement of the virtual object 51 in the virtual image 50 to the amount of movement m of the imaging range in the real space is changed according to the imaging magnification of the captured image 60.

To achieve this display, first, the extraction section 212 should change the ratio of the amount of movement of the virtual object 51 in the virtual image 50 to the amount of movement m of the imaging range in the real space according to the imaging magnification of the captured image 60. Then, the extraction section 212 should move the virtual object 51 in the virtual image 50 by the amount of movement that has been calculated based on the changed ratio. The display control section 112 has only to display the moved virtual object 51.

In particular, if the amount of movement of the virtual object 51 in the virtual image 50 becomes small when imaging at the imaging magnification p-y as compared with the case of imaging at the imaging magnification p-x, it is expected that the usability for the user is improved. Specifically, as shown in FIG. 7, it is preferable that the amount of movement ny of the virtual object 51 in the virtual image 50 at the time of imaging at an imaging magnification p-y should be smaller than the amount of movement nx of the virtual object 51 in the virtual image 50 at the time of imaging at an imaging magnification p-x.

Thus, the display control section 112 should display the virtual object 51 in such a way that the higher the imaging magnification of the captured image 60, the smaller the ratio of the amount of movement of the virtual object 51 in the virtual image 50 to the amount of movement of the imaging range in the real space becomes. To achieve this display, the extraction section 212 should set smaller the ratio of the amount of movement of the virtual object 51 in the virtual image 50 to the amount of movement of the imaging range in the real space as the imaging magnification of the captured image 60 becomes higher. In FIG. 7, the virtual object before movement is denoted by 51-1, and the moved virtual object is denoted by 51-2.

Heretofore, the outline of the information processing system 1 according to the embodiment of the present disclosure has been described.

[1-5. Function Details of the Information Processing System]

Figure 8:
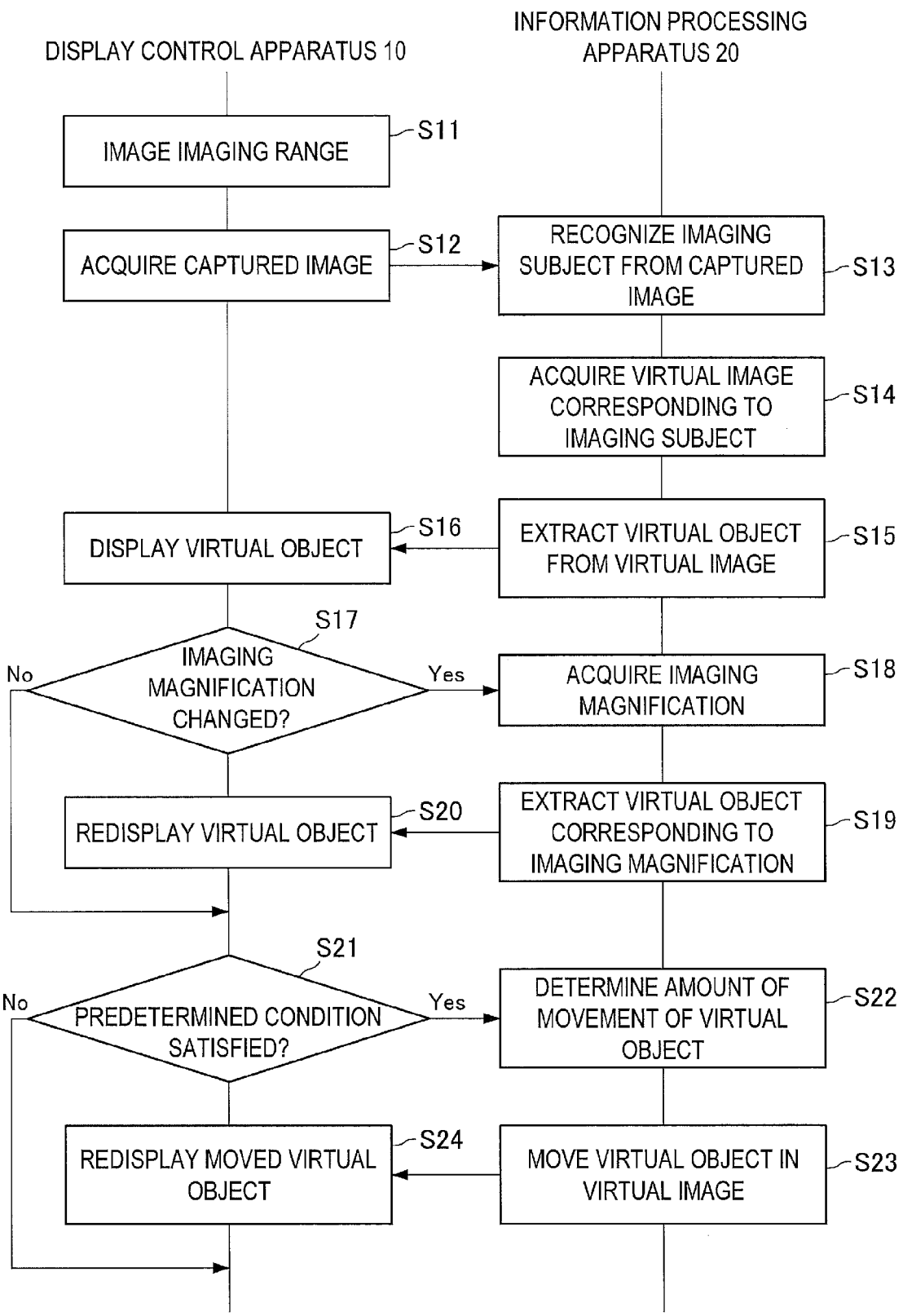
FIG. 8 is a flowchart illustrating an operation example of the information processing system according to the embodiment of the present disclosure.

Subsequently, the detailed function of the information processing system 1 according to the embodiment of the present disclosure will be described. First, an operation example of the information processing system 1 according to the embodiment of the present disclosure will be described. FIG. 8 is a flowchart illustrating the operation example of the information processing system 1 according to the embodiment of the present disclosure.

As shown in FIG. 8, first, when the imaging section 130 images the imaging range (S11), the image acquisition section 111 acquires an image captured by the imaging section 130 (S12). Subsequently, the recognizing section 211 recognizes an imaging subject from the captured image (S13), and acquires a virtual image corresponding to the imaging subject (S14). In the case where the imaging subject is not recognized by the recognition section 211, the display control section 112 should perform control such that the captured image is displayed.

Subsequently, the extracting section 212 extracts a virtual object from the virtual image (S15), and the display control section 112 controls the display section 160 in such a way that the virtual object is displayed on the display section 160. The display section 160 displays the virtual object under control of the display control section 112 (S16). When the imaging magnification is changed thereafter ("Yes" in S17), the extraction section 212 acquires the imaging magnification (S18), and extracts a virtual object corresponding to the imaging magnification from the virtual image (S19).

Subsequently, the display control section 112 controls the display section 160 in such a way that the virtual object is displayed on the display section 160. The display section 160 redisplays the virtual object under control of the display control section 112 (S20). When the imaging magnification is not changed ("No" at S17), the operation should proceed to S21.

Subsequently, when a predetermined condition is satisfied ("Yes" in S21), the extraction section 212 determines the amount of movement of the virtual object in the virtual image (S22), and moves the virtual object in the virtual image (S23). The display control section 112 controls the display section 160 in such a way that the moved virtual object is displayed on the display section 160. The display section 160 redisplays the virtual object under control of the display control section 112 (S24).

Here, the predetermined condition is not particularly limited. For example, the predetermined condition may be a condition such that the imaging range has moved, or may be another condition. The predetermined condition will be described in detail later.

The operation after S24 is not particularly limited. For example, while the imaging subject is recognized by the recognition section 211, the operation following S17 may be repeated. By way of contrast, when the recognizing section 211 recognizes another imaging subject, for example, the operation following S14 may be repeated. Further, when the imaging subject is no longer recognized by the recognizing section 211, the display control section 112 may control the display section 160 in such a way that the captured image is displayed on the display section 160.

Heretofore, the operation example of the information processing system 1 according to the embodiment of the present disclosure has been described.

Figure 9:
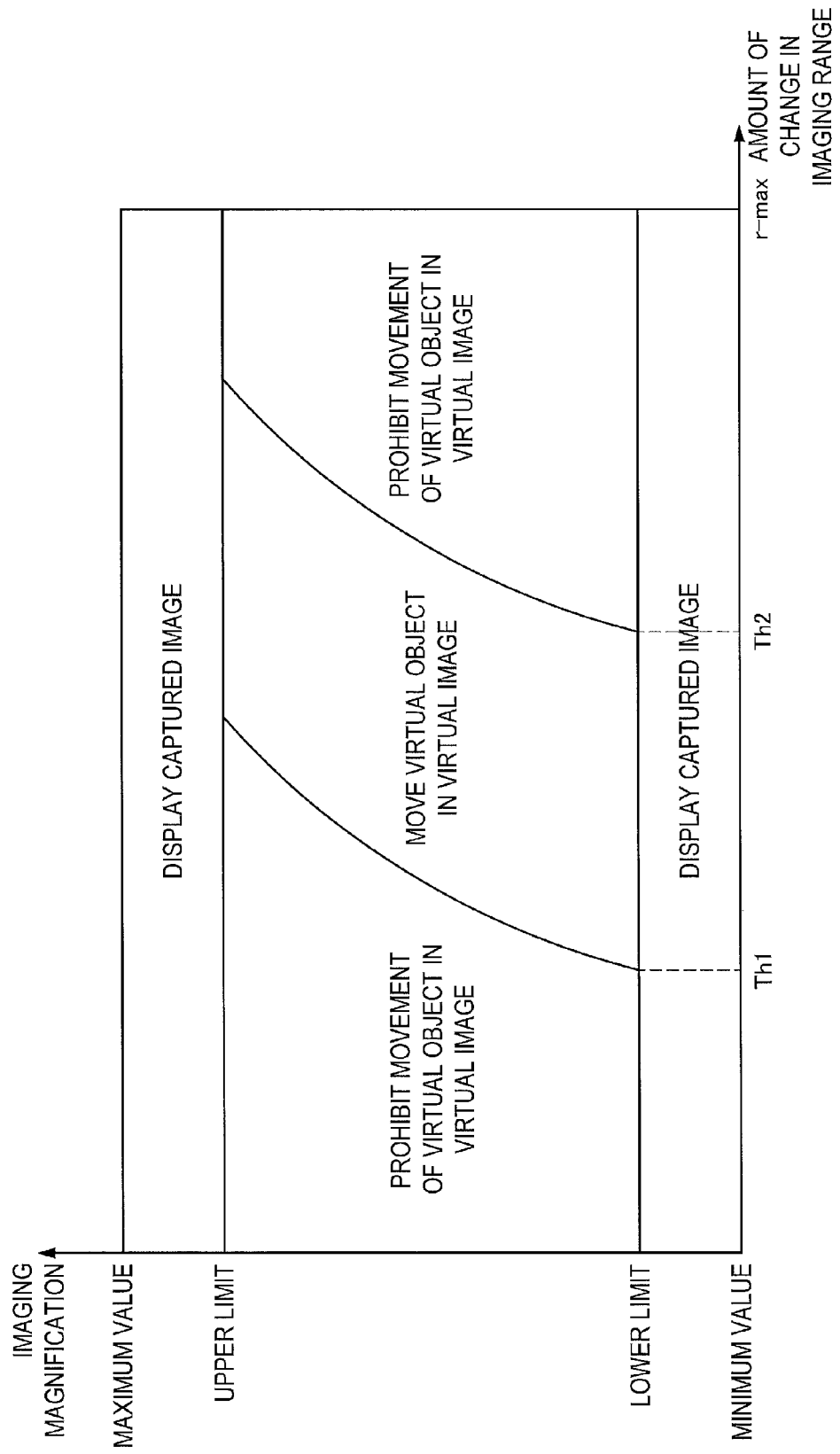
FIG. 9 is a diagram for describing an example of the relationship among the amount of a change in the imaging range, the imaging magnification, and the display content.

The following will describe an example of the relationship among the amount of a change in the imaging range, the imaging magnification, and the display content. FIG. 9 is a diagram for describing an example of the relationship among the amount of a change in the imaging range, the imaging magnification, and the display content. As shown in FIG. 9, when the imaging magnification is higher than the upper limit of the imaging magnification at which a virtual object is displayable, the display control section 112 should control the display section 160 in such a way that the captured image is displayed on the display section 160. Further, when the imaging magnification is lower than the lower limit of the imaging magnification at which a virtual object is displayable, the display control section 112 should control the display section 160 in such a way that the captured image is displayed on the display section 160.

Note that the upper limit value and the lower limit value of the imaging magnification at which a virtual object is displayable may be determined in advance. This is because when the imaging magnification is set too large or too small, the size of the virtual object may no longer be appropriate. The range from such a lower limit to such an upper limit corresponds to the range of the imaging magnification at which the virtual object is displayable. Further, in FIG. 9, "Maximum Value" corresponds to the maximum value that can be set for the imaging magnification of the imaging section 130, and "Minimum Value" corresponds to the minimum value that can be set for the imaging magnification of the imaging section 130.

When the imaging magnification lies in the range where a virtual object is displayable, the virtual object may always be moved in the virtual image with the movement of the imaging range; however, a predetermined condition is satisfied, as described above, the virtual object may be moved. For example, it is assumed that the imaging range is changed by the hand shaking of the user when the amount of a change in the imaging range is below a first threshold. In such a case, therefore, the display control section 112 may prohibit the movement of the virtual object in the virtual image. In the example shown in FIG. 9, the first threshold is shown as a threshold Th1 when the imaging magnification is the lower limit.

Here, the amount of a change in the imaging range may be acquired by any method. For example, the display control section 112 may measure the amount of movement of the feature points in the captured image as the amount of a change in the imaging range. The display control section 112 may acquire the amount of movement of the imaging section 130 which is detected by a predetermined sensor, as the amount of a change in the imaging range. The type of the predetermined sensor is not particularly limited; when the predetermined sensor is an acceleration sensor, for example, the acceleration measured by the acceleration sensor may be acquired as the amount of change in the imaging range.

The first threshold may be constant regardless of the imaging magnification, but may be varied according to the imaging magnification. That is, the display control section 112 may control the first threshold according to the imaging magnification of the captured image. For example, as described above, as the imaging magnification of the captured image becomes higher, the imaging location becomes narrower, so that the amount of relative movement of the imaging range based on the size of the imaging location is increased. Therefore, as the imaging magnification of the captured image is larger, the display control section 112 may increase the first threshold. In this way, even if a change in the imaging range becomes large to some extent, the movement of the virtual object is prohibited, so that an improvement on the usability for the user is expected.

Although the line indicating the first threshold is a curve, the shape of the curve is not limited. Alternatively, the line indicating the first threshold may be a straight line. That is, the first threshold may be linearly changed or may be changed nonlinearly with a change in the imaging magnification.

By way of contrast, when the amount of a change in the imaging range lies between the first threshold and a second threshold, for example, it is assumed that the user is attempting to view a virtual object while moving the virtual object in the virtual image. In such a case, therefore, the display control section 112 may move the virtual object in the virtual image. In the example shown in FIG. 9, the second threshold is shown as a threshold Th2 when the imaging magnification is the lower limit.

In addition, when the amount of a change in the imaging range is above the second threshold, for example, it is assumed that the user is not attempting to view a virtual object. In such a case, therefore, the display control section 112 may prohibit the movement of the virtual object in the virtual image.

Like the first threshold, the second threshold may also be constant regardless of the imaging magnification, but may be varied according to the imaging magnification. That is, the display control section 112 may control the second threshold according to the imaging magnification of the captured image. For example, as described above, as the imaging magnification of the captured image becomes higher, the imaging location becomes narrower, so that the amount of relative movement of the imaging range based on the size of the imaging location is increased. Therefore, as the imaging magnification of the captured image is larger, the display control section 112 may increase the second threshold. In this way, even if a change in the imaging range becomes large to some extent, the virtual object is moved, so that an improvement on the usability for the user is expected.

Although the line indicating the second threshold is a curve, the shape of the curve is not limited. Alternatively, the line indicating the second threshold may be a straight line. That is, the second threshold may be linearly changed or may be changed nonlinearly with a change in the imaging magnification.

Heretofore, the example of the relationship among the amount of a change in the imaging range, the imaging magnification, and the display content has been described.

Figure 10:
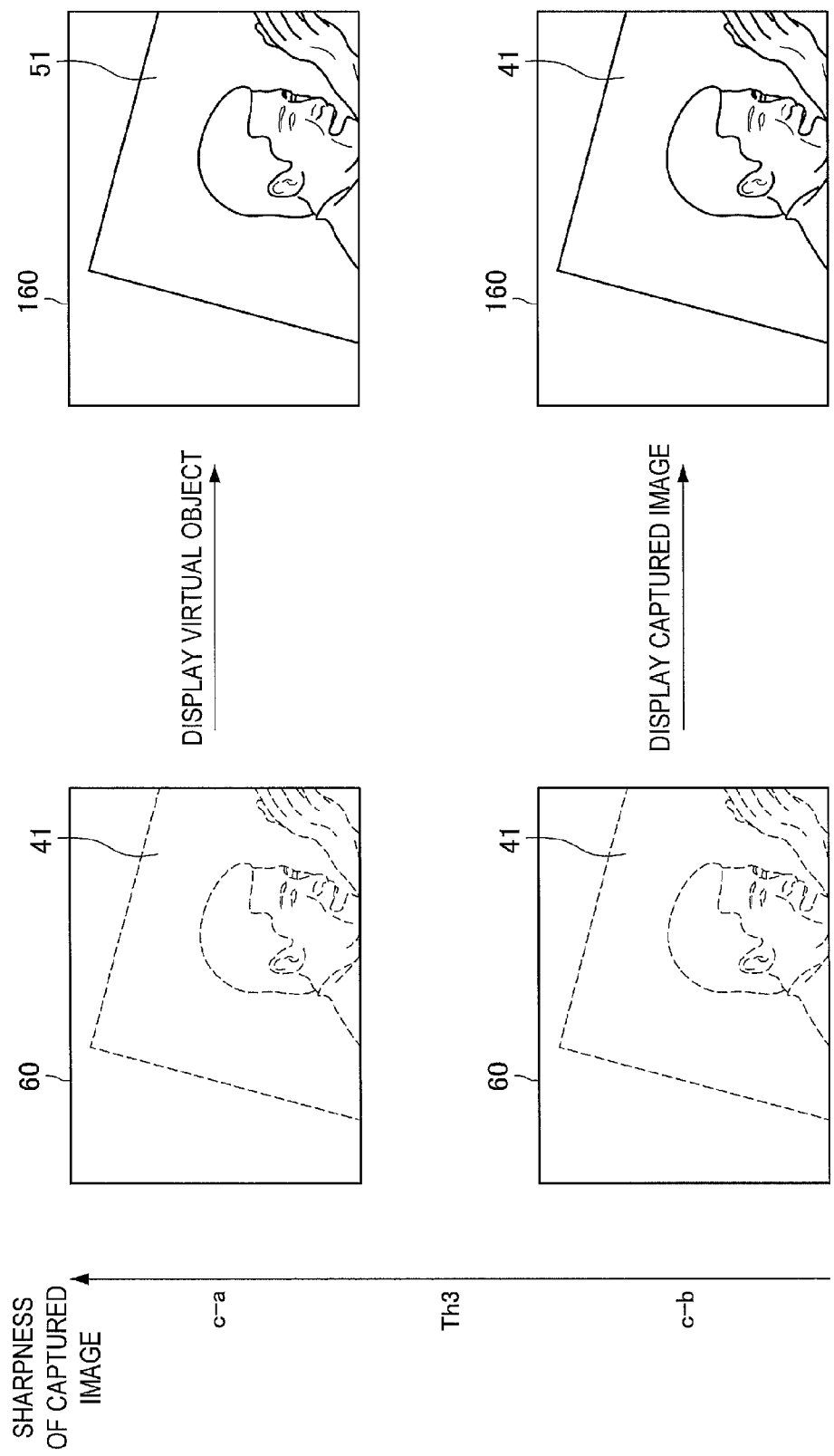
FIG. 10 is a diagram for describing an example of the relationship between the sharpness of a captured image and the display content.

Next, an example of the relationship between the sharpness and the display content of a captured image will be described. FIG. 10 is a diagram for describing an example of the relationship between the sharpness and the display content of the captured image. The above description has been given of the case where when an imaging subject is recognized from the captured image, a virtual object corresponding to the imaging subject is displayed, and when an imaging subject is not recognized from the captured image, the captured image is displayed.

However, whether to display the captured image or to display a virtual object may be switched according to the sharpness of the captured image. When the sharpness of the captured image is higher than a predetermined threshold, for example, it is assumed that the captured image is suitable for the user to view the captured image, whereas when the sharpness of the captured image is lower than the predetermined threshold, it is assumed that the captured image is not suitable for the user to view the captured image.

Therefore, when the sharpness of the captured image exceeds the predetermined threshold, the display control section 112 may perform control so that the captured image is displayed. On the other hand, when the sharpness of the captured image falls below the predetermined threshold, the display control section 112 may perform control so that the virtual object is displayed. In the example shown in FIG. 10, the sharpness c-a of the captured image is higher than a threshold Th3, whereas the sharpness c-b of the captured image is lower than the threshold Th3. In such a case, the display control section 112 may perform control so that a virtual object is displayed in case of the sharpness c-a of the captured image, and may perform control so that the captured image is displayed.

Heretofore, the example of the relationship between the sharpness and the display content of the captured image has been described.

Figure 11:
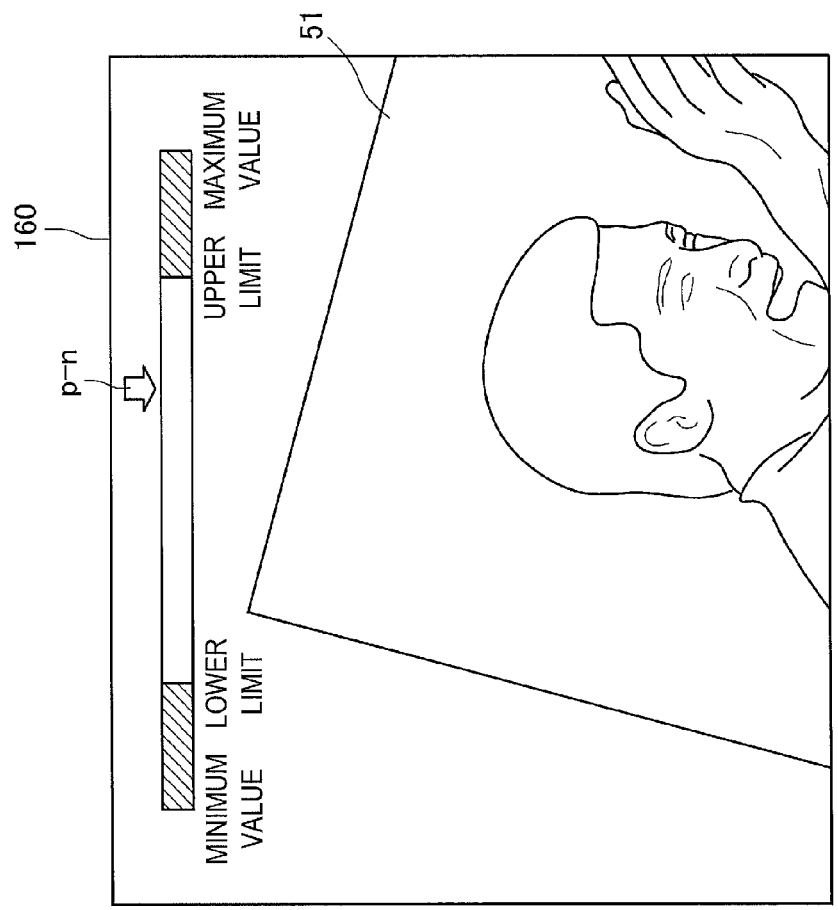
FIG. 11 is a diagram illustrating a display example of the range of an imaging magnification at which a virtual object can be displayed.

Subsequently, a display example in the range of the imaging magnification where a virtual object is displayable will be described. FIG. 11 is a diagram showing a display example in the range of the imaging magnification where a virtual object is displayable. As described above, the range from the lower limit of the imaging magnification to the upper limit of the imaging magnification corresponds to the range of the imaging magnification where a virtual object is displayable. Accordingly, as the display control section 112 performs control in such a way as to display the range of the imaging magnification where a virtual object is displayable, an improvement on the usability for the user is expected.

In the example shown in FIG. 11, the display control section 112 performs control in such a way as to display the range of the imaging magnification where a virtual object is displayable in terms of the range from the lower limit to the upper limit. Alternatively, as shown in FIG. 11, the display control section 112 may perform control in such a way as to display the range from the lower limit to the upper limit that can be set as the imaging magnification of the imaging section 130. Further, as shown in FIG. 11, the display control section 112 may perform control in such a way as to display the current imaging magnification p-n.

Heretofore, the display example of the range of the imaging magnification where a virtual object is displayable has been described.

Subsequently, the display of recommended imaging magnifications will be described. The recommended imaging magnification may differ from one virtual image to another virtual image. Therefore, if the display control section 112 performs control to display recommended imaging magnifications associated with virtual images, the user can readily view a virtual image by matching the imaging magnification with the associated recommended imaging magnification.

Moreover, the recommended imaging magnification may vary from one area of a virtual image to another area of the virtual image. Therefore, if the display control section 112 performs control to display recommended imaging magnifications associated with the respective areas of the virtual image, the user can readily view an area of the virtual image by matching the imaging magnification with the associated recommended imaging magnification.

Figure 12:
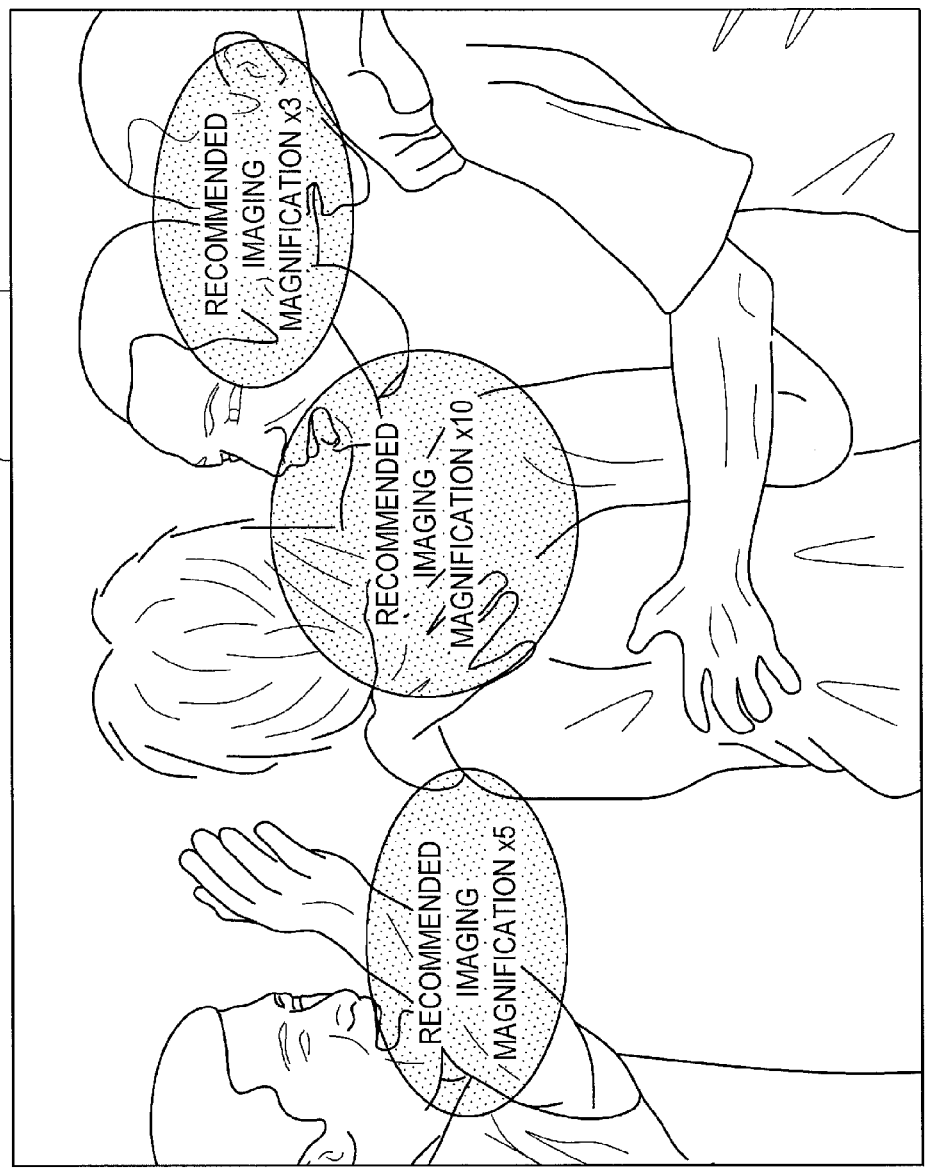
FIG. 12 is a diagram illustrating a display example of recommended imaging magnifications associated with the respective areas of a virtual image.

FIG. 12 is a diagram illustrating a display example of recommended imaging magnifications associated with the respective areas of a virtual image. In the example shown in FIG. 12, the display control section 112 performs control in such a way that recommended imaging magnifications associated with the respective areas of a virtual image are displayed like "recommended imaging magnification ×5," "recommended imaging magnification ×10," "recommended imaging magnification ×3" and the like. The recommended imaging magnifications may be registered beforehand in association with virtual images.

Heretofore, the display of recommended imaging magnifications has been described.

Next, an example of changing the posture of a virtual object according to the imaging magnification will be described. The display control section 112 may display a virtual object on the display section 160 by adjusting the posture of the virtual object to match with the posture of the imaging subject as described above, or may display a virtual object on the display section 160 without adjusting the posture of the virtual object. When the imaging magnification is high, for example, a virtual object is displayed large on the screen, eliminating the need for adjustment of the posture of the virtual object, whereas when the imaging magnification is low, a virtual object is displayed small on the screen, so that the posture of the virtual object may be adjusted.

Therefore, the display control section 112 should display a virtual object as if the posture of the virtual object were changed according to the imaging magnification of the captured image. When the imaging magnification is lower than a predetermined threshold, the display control section 112 may display the virtual object by adjusting the posture of the virtual object to match with the posture of the imaging subject, whereas when the imaging magnification is higher than the predetermined threshold, the display control section 112 may display the virtual object without adjusting the posture of the virtual object.

Figure 13:
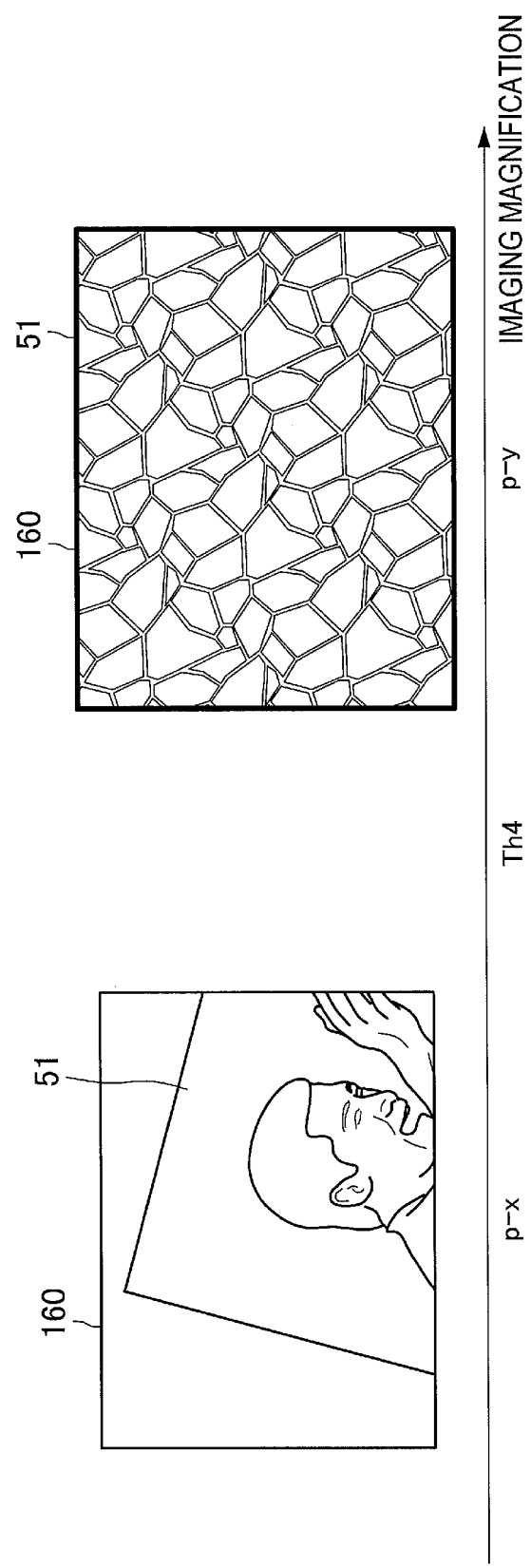
FIG. 13 is a diagram for describing an example where the posture of a virtual object is changed according to the imaging magnification.

FIG. 13 is a diagram for describing an example where the posture of a virtual object is changed according to the imaging magnification. In the example shown in FIG. 13, the imaging magnification p-x is lower than a threshold Th4, and the imaging magnification p-y is higher than the threshold Th4. Therefore, the display control section 112 may display the virtual object 51 by adjusting the posture of the virtual object 51 to match with the posture of the imaging subject when the imaging subject is imaged at the imaging magnification p-x, and may display the virtual object 51 without adjusting the posture of the virtual object 51 when the imaging subject is imaged at the imaging magnification p-y.

Heretofore, the example where the posture of a virtual object is changed according to the imaging magnification has been described. In addition, the detailed function of the information processing system 1 according to the embodiment of the present disclosure has been described.

[1-6. Hardware Configuration Examples]

Figure 14:
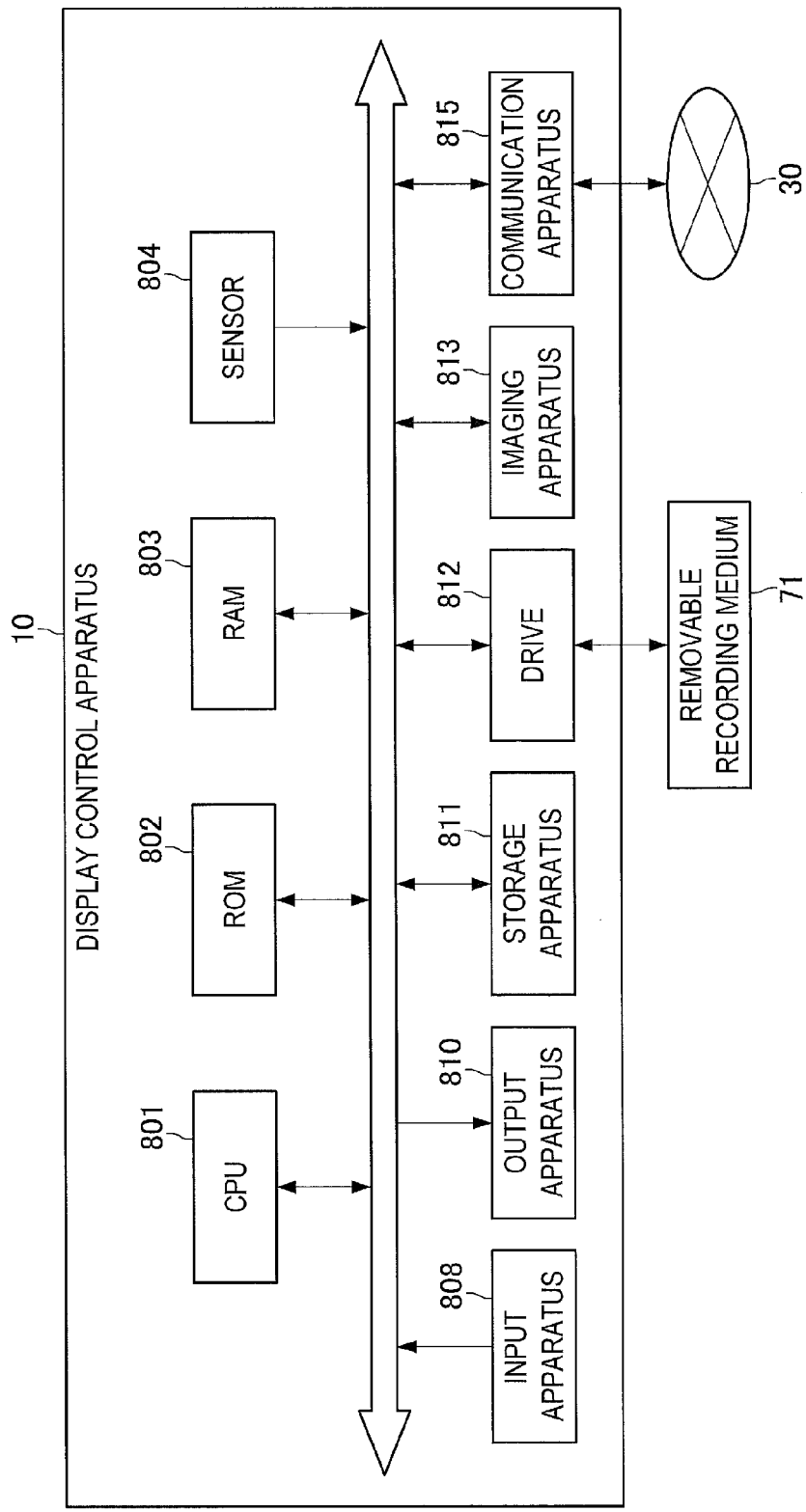
FIG. 14 is a diagram illustrating a hardware configuration example of the display control apparatus according to the embodiment of the present disclosure.

To continue, a hardware configuration example of the display control apparatus 10 according to an embodiment of the present disclosure will be described. FIG. 14 is a figure which shows a hardware configuration example of the display control apparatus 10 according to an embodiment of the present disclosure. However, the hardware configuration example shown in FIG. 14 merely shows an example of the hardware configuration of the display control apparatus 10. Therefore, the hardware configuration of the display control apparatus 10 is not limited to the example shown in FIG. 14.

As shown in FIG. 14, the display control apparatus 10 includes a CPU (Central Processing Unit) 801, a ROM (Read Only Memory) 802, a RAM (Random Access Memory) 803, a sensor 804, an input apparatus 808, an output apparatus 810, a storage apparatus 811, a drive 812, an imaging apparatus 813, and a communication apparatus 815.

The CPU 801 functions as an operation processing apparatus and a control apparatus, and controls all the operations within the display control apparatus 10 in accordance with various programs. Further, the CPU 801 may be a microprocessor. The ROM 802 stores programs and operation parameters used by the CPU 801. The RAM 803 temporarily stores programs used in the execution of the CPU 801, and parameters which arbitrarily change in this execution. These sections are mutually connected by a host bus constituted from a CPU bus or the like.

The sensor 804 includes various sensors, such as a terminal status sensor for detecting the status of the display control apparatus 10, and peripheral circuits of the detection sensors. Examples of the sensor 804 may include a tilt sensor, an acceleration sensor, an azimuth sensor, a temperature sensor, a humidity sensor, and an illuminance sensor. The detection signal obtained by the sensor 804 is sent to the CPU 801. Accordingly, the CPU 801 can find the status of the display control apparatus 10 (the tilt, acceleration, azimuth, temperature, humidity, illuminance, etc.).

The input apparatus 808 includes an input section, such as a mouse, a keyboard, a touch panel, buttons, a microphone, switches or leavers, for a user to input information, and an input control circuit which generates an input signal based on an input by the user, and outputs the input signal to the CPU 801. By operating this input apparatus 808, it is possible for the user of the display control apparatus 10 to input various data for the display control apparatus 10 and to instruct the process operations.

The output apparatus 810 includes, for example, a display device such as a liquid crystal display (LCD) apparatus, an OLED (Organic Light Emitting Diode) apparatus, or a lamp. In addition, the output apparatus 810 includes a sound output apparatus such as a speaker or headphones. For example, the display device displays an imaged image or a generated image. On the other hand, the sound output apparatus converts sound data and outputs sounds.

The storage apparatus 811 is an apparatus for data storage constituted as an example of a storage section of the display control apparatus 10. The storage apparatus 811 may include a storage medium, a recording apparatus which records data to the storage medium, a reading apparatus which reads data from the storage medium, and an erasure apparatus which erases data recorded in the storage medium. This storage apparatus 811 stores programs executed by the CPU 801 and various data.

The drive 812 is a reader/writer for the storage medium, and is built into the display control apparatus 10 or is externally attached. The drive 812 reads information recorded on a removable storage medium 71, such as a mounted magnetic disk, an optical disk, a magneto-optical disk, or a semiconductor memory, and outputs the information to the RAM 803. Further, the drive 812 can write information to the removable storage medium 71.

The imaging apparatus 813 includes an imaging optical system such as a taking lens and a zoom lens for collecting light, and a signal conversion element such as a charge coupled device (CCD) or complementary metal oxide semiconductor (CMOS). The imaging optical system condenses the light emitted from a subject to form a subject image in the signal conversion section, which in turn converts the formed subject image into an electrical image signal.

The communication apparatus 815 is, for example, a communication interface constituted by a communication device or the like for connecting to a network. Further, even if the communication apparatus 815 is a communication apparatus adaptive to wireless LAN (Local Area Network) or LTE (Long Term Evolution), the communication apparatus 815 may be a wired communication apparatus which communicates by wires. For example, it is possible for the communication apparatus 815 to communicate with the information processing apparatus 20 via the network 30.

Heretofore, a hardware configuration example of the display control apparatus 10 according to an embodiment of the present disclosure has been described.

Figure 15:
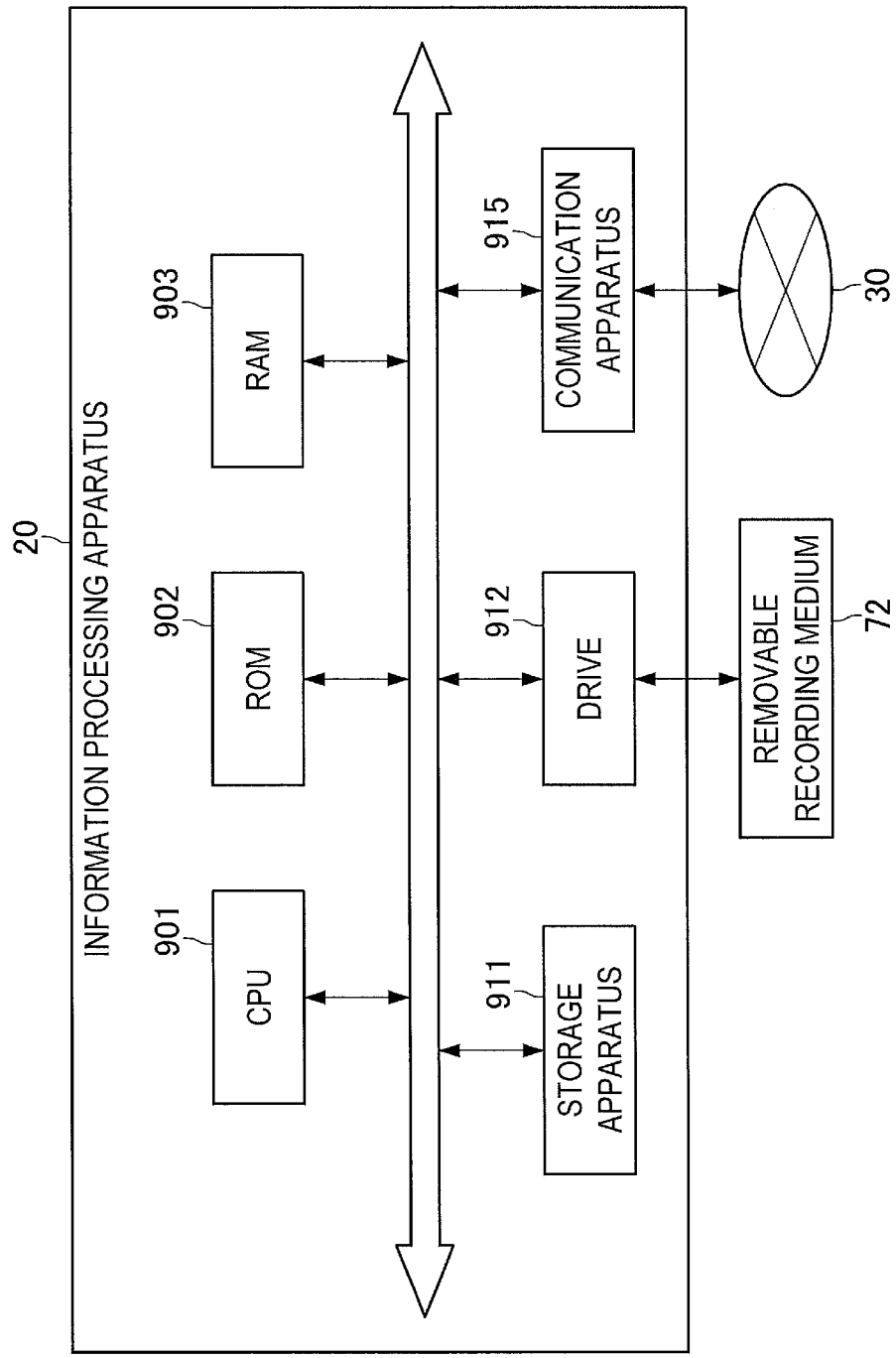
FIG. 15 is a diagram illustrating a hardware configuration example of the information processing apparatus according to the embodiment of the present disclosure.

To continue, a hardware configuration example of the information processing apparatus 20 according to an embodiment of the present disclosure will be described. FIG. 15 is a figure which shows a hardware configuration example of the information processing apparatus 20 according to an embodiment of the present disclosure. However, the hardware configuration example shown in FIG. 15 merely shows an example of the hardware configuration of the information processing apparatus 20. Therefore, the hardware configuration of the information processing apparatus 20 is not limited to the example shown in FIG. 15.

As shown in FIG. 15, the information processing apparatus 20 includes a CPU (Central Processing Unit) 901, a ROM (Read Only Memory) 902, a RAM (Random Access Memory) 903, a storage apparatus 911, a drive 912, and a communication apparatus 915.

The CPU 901 functions as an operation processing apparatus and a control apparatus, and controls all the operations within the information processing apparatus 20 in accordance with various programs. Further, the CPU 901 may be a microprocessor. The ROM 902 stores programs and operation parameters used by the CPU 901. The RAM 903 temporarily stores programs used in the execution of the CPU 901, and parameters which arbitrary change in this execution. These sections are mutually connected by a host bus constituted from a CPU bus or the like.

The storage apparatus 911 is an apparatus for data storage constituted as an example of a storage section of the information processing apparatus 20. The storage apparatus 911 may include a storage medium, a recording apparatus which records data to the storage medium, a reading apparatus which reads data from the storage medium, and an erasure apparatus which erases data recorded in the storage medium. This storage apparatus 911 stores programs executed by the CPU 901 and various data.

The drive 912 is a reader/writer for the storage medium, and is built into the information processing apparatus 20 or is externally attached. The drive 912 reads information recorded on a removable storage medium 71, such as a mounted magnetic disk, an optical disk, a magneto-optical disk, or a semiconductor memory, and outputs the information to the RAM 903. Further, the drive 912 can write information to the removable storage medium 71.

The communication apparatus 915 is, for example, a communication interface constituted by a communication device or the like for connecting to a network. Further, even if the communication apparatus 915 is a communication apparatus adaptive to wireless LAN (Local Area Network) or LTE (Long Term Evolution), the communication apparatus 915 may be a wired communication apparatus which communicates by wires. For example, it is possible for the communication apparatus 915 to communicate with the information processing apparatus 20 via the network 30.

2. Closing

As described above, according to the embodiments of the present disclosure, there is provided the display control apparatus 10 including the image acquisition section 111 that acquires a captured image obtained by imaging an imaging range, and the display control section 112 that controls in such a way that a virtual object extracted from a virtual image corresponding to an imaging subject reflecting on the captured image. The display control section 112 displays the virtual object in such a way that the ratio of the amount of movement of the virtual object in the virtual image to the amount of movement of the imaging range in real space changes according to the imaging magnification of the captured image. This configuration makes it possible to improve the usability for the user.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Further, a program for causing hardware, such as a CPU, ROM and RAM built into a computer, to exhibit functions similar to the configuration included in the above described display control apparatus 10 can be created. Further, a recording medium can also be provided which records these programs and is capable of performing reading to the computer.

Further, a program for causing hardware, such as a CPU, ROM and RAM built into a computer, to exhibit functions similar to the configuration included in the above information processing apparatus 20 can be created. Further, a recording medium can also be provided which records these programs and is capable of performing reading to the computer.

Additionally, the present technology may also be configured as below.

(1)

A display control apparatus including:

an image acquisition section that acquires a captured image obtained by imaging an imaging range; and a display control section that controls a display section in such a way that a virtual object corresponding to an imaging subject reflecting on the captured image is displayed, wherein the display control section displays the virtual object in such a way that a ratio of an amount of movement of the virtual object in a virtual image to an amount of movement of the imaging range in real space changes according to an imaging magnification of the captured image.

(2) The display control apparatus according to (1), wherein the display control section controls the display section in such a way that a virtual object extracted from a virtual image corresponding to the imaging subject is displayed.

(3) The display control apparatus according to (1), wherein the display control section displays the virtual object in such a way that as the imaging magnification of the captured image is higher, the ratio of the amount of movement of the virtual object in the virtual image to the amount of movement of the imaging range in the real space is smaller.

(4) The display control apparatus according to any one of (1) to (3), wherein the display control section prohibits the movement of the virtual object in the virtual image when the amount of change in the imaging range is smaller than a first threshold.

(5) The display control apparatus according to (4), wherein the display control section controls the first threshold according to the imaging magnification of the captured image.

(6) The display control apparatus according to (5), wherein the display control section sets the first threshold larger as the imaging magnification of the captured image is higher.

(7) The display control apparatus according to any one of (4) to (6), wherein the display control section prohibits the movement of the virtual object in the virtual image when the amount of change in the imaging range is larger than a second threshold.

(8) The display control apparatus according to (7), wherein the display control section controls the second threshold according to the imaging magnification of the captured image.

(9) The display control apparatus according to any one of (1) to (8), wherein the display control section performs control in such a way that the captured image is displayed when a sharpness of the captured image exceeds a predetermined threshold, and performs control in such a way that the virtual object is displayed when the sharpness of the captured image is less than the predetermined threshold.

(10) The display control apparatus according to any one of (1) to (9), wherein the display control section performs control in such a way as to display a range of the imaging magnification at which the virtual object is displayable.

(11) The display control apparatus according to any one of (1) to (10), wherein the display control section performs control in such a way that a recommended imaging magnification associated with the virtual image is displayed.

(12) The display control apparatus according to (11), wherein the display control section performs control in such a way that recommended imaging magnifications associated with individual areas of the virtual image are displayed.

(13) The display control apparatus according to any one of (1) to (12), wherein the display control section performs control in such a way as to display a virtual object which has undergone a filtering process according to the captured image.

(14) The display control apparatus according to any one of (1) to (13), wherein the display control section displays the virtual object in such a way that a posture of the virtual object is changed according to the imaging magnification of the captured image.

(15) A display control method including:
acquiring a captured image obtained by imaging an imaging range;
controlling a display section in such a way that a virtual object corresponding to an imaging subject reflecting on the captured image is displayed; and
displaying the virtual object in such a way that a ratio of an amount of movement of the virtual object in the virtual image to an amount of movement of the imaging range in real space changes according to an imaging magnification of the captured image.

(16) A computer-readable recording medium recording a program for allowing a computer to function as a display control apparatus including:
an image acquisition section that acquires a captured image obtained by imaging an imaging range; and
a display control section that controls a display section in such a way that a virtual object corresponding to an imaging subject reflecting on the captured image is displayed,
wherein the display control section displays the virtual object in such a way that a ratio of an amount of movement of the virtual object in a virtual image to an amount of movement of the imaging range in real space changes according to an imaging magnification of the captured image.

REFERENCE SIGNS LIST 1 information processing system
10 display control apparatus
20 information processing apparatus
30 network
40 imaging subject
41 imaging location
60 captured image
50 virtual image
51 virtual object
110 control section
111 image acquisition section
112 display control section
120 operation section
130 imaging section
140 storage section
150 communication section
160 display section
210 control section
211 recognition section
212 extraction section
220 storage section
230 communication section
221 recognition section

The invention claimed is:
1. A display control apparatus, comprising:
one or more processors configured to:
control a camera to acquire a first image of an imaging region in real space, wherein the imaging region in the real space comprises at least one real subject in the real space, and wherein the imaging region in the real space moves based on an imaging direction of the camera;

acquire from a storage medium, a virtual image that represents at least one portion of the at least one real subject, based on an amount of features of the at least one real subject;

extract a virtual object from the virtual image, based on a first amount of movement of the imaging region in the real space and an imaging magnification amount of the first image; and control a display device to display the virtual object such that the virtual object moves within the virtual image by a second amount of movement, wherein the second amount of movement is based on the first amount of movement of the imaging region in the real space and the imaging magnification amount of the first image.

2. The display control apparatus according to claim 1, wherein the one or more processors are further configured to:

control the display device to display the virtual object, wherein a ratio of the second amount of movement of the virtual object in the virtual image to the first amount of movement of the imaging region in the real space decreases with an increase in the imaging magnification amount of the first image.

3. The display control apparatus according to claim 1, wherein the one or more processors are further configured to prohibit movement of the virtual object in the virtual image, based on the first amount of movement of the imaging region in the real space that is smaller than a first threshold.

4. The display control apparatus according to claim 3, wherein the one or more processors are further configured to change the first threshold based on the imaging magnification amount of the first image.

5. The display control apparatus according to claim 4, wherein the one or more processors are further configured to increase the first threshold based on the imaging magnification amount of the first image that is higher than a minimum imaging magnification value.

6. The display control apparatus according to claim 3, wherein the one or more processors are further configured to prohibit movement of the virtual object in the virtual image, based on the first amount of movement of the imaging region in the real space that is larger than a second threshold.

7. The display control apparatus according to claim 6, wherein the one or more processors are further configured to change the second threshold, based on the imaging magnification amount of the first image.

8. The display control apparatus according to claim 1, wherein the one or more processors are further configured to perform one of:

control the display device to display the first image, based on sharpness of the first image that exceeds a threshold value; or control the display device to display the virtual object, based on the sharpness of the first image that is less than the threshold value.

9. The display control apparatus according to claim 1, wherein the one or more processors are further configured to control the display device to display a range of the imaging magnification amount of the first image in which a clarity level of the virtual object in the display device is within a threshold range.

10. The display control apparatus according to claim 1, wherein the one or more processors are further configured to control the display device to display a recommended imaging magnification range associated with the virtual image.

11. The display control apparatus according to claim 10, wherein the one or more processors are further configured to control the display device to display the recommended imaging magnification range associated with each of a plurality of areas of the virtual image.

12. The display control apparatus according to claim 1, wherein the one or more processors are further configured to:

control a filter circuit to filter the virtual object, based on the first image; and display the filtered virtual object.

13. The display control apparatus according to claim 1, wherein the one or more processors are further configured to display the virtual object such that a posture of the virtual object changes based on the imaging magnification amount of the first image.

14. A display control method, comprising:

controlling a camera for acquiring a first image of an imaging region in real space, wherein the imaging region in the real space comprises at least one real subject in the real space, and wherein the imaging region in the real space moves based on an imaging direction of the camera;

acquiring from a storage medium, a virtual image that represents at least one portion of the at least one real subject, based on an amount of features of the at least one real subject;

extracting a virtual object from the virtual image, based on a first amount of movement of the imaging region in the real space and an imaging magnification amount of the first image; and controlling a display device to display the virtual object such that the virtual object moves within the virtual image by a second amount of movement, wherein the second amount of movement is based on the first amount of movement of the imaging region in the real space and the imaging magnification amount of the first image.

15. A non-transitory computer-readable medium having stored thereon, computer-executable instructions for causing a computer to execute operations, the operations comprising:

controlling a camera for acquiring a first image of an imaging region in real space, wherein the imaging region in the real space comprises at least one real subject in the real space, and wherein the imaging region in the real space moves based on an imaging direction of the camera;

acquiring from a storage medium, a virtual image that represents at least one portion of the at least one real subject, based on an amount of features of the at least one real subject;

extracting a virtual object from the virtual image, based on a first amount of movement of the imaging region in the real space and an imaging magnification amount of the first image; and controlling a display device to display the virtual object such that the virtual object moves within the virtual image by a second amount of movement, wherein the second amount of movement is based on the first amount of movement of the imaging region in the real space and the imaging magnification amount of the first image.

* * * * *